(12) United States Patent
Vargas et al.

(10) Patent No.: US 8,151,106 B2
(45) Date of Patent: *Apr. 3, 2012

(54) DYNAMICALLY RESOLVING RECIPIENTS TO RETRIEVE PUBLIC KEYS DURING SEND/RECEIVE

(75) Inventors: Garrett R. Vargas, Sammamish, WA (US); Paul K. Kroman, Redmond, WA (US); Selvaraj Nalliah, Redmond, WA (US); Eian D. Counts, Gangnam-Gu (KR); Gary W. Hall, Redmond, WA (US); Anoop Gupta, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/775,852

(22) Filed: May 7, 2010

(65) Prior Publication Data

US 2010/0229051 A1 Sep. 9, 2010

Related U.S. Application Data

(63) Continuation of application No. 11/144,896, filed on Jun. 3, 2005, now Pat. No. 7,716,479.

(51) Int. Cl.
 *H04L 9/00* (2006.01)
(52) U.S. Cl. ........ 713/153; 713/151; 713/156; 713/170; 726/28
(58) Field of Classification Search .................... 713/153
 See application file for complete search history.

(56) References Cited

U.S. PATENT DOCUMENTS

| 6,061,448 | A | * | 5/2000 | Smith et al. | 380/282 |
|---|---|---|---|---|---|
| 6,442,600 | B1 | * | 8/2002 | Anderson | 709/217 |
| 6,651,166 | B1 | * | 11/2003 | Smith et al. | 713/150 |
| 6,732,101 | B1 | * | 5/2004 | Cook | 1/1 |
| 7,716,479 | B2 | | 5/2010 | Vargas et al. | |
| 2002/0052923 | A1 | | 5/2002 | Anderson | |
| 2002/0169954 | A1 | * | 11/2002 | Bandini et al. | 713/153 |
| 2003/0154371 | A1 | * | 8/2003 | Filipi-Martin et al. | 713/153 |
| 2003/0172262 | A1 | * | 9/2003 | Curry | 713/156 |
| 2004/0015504 | A1 | * | 1/2004 | Ahad et al. | 707/100 |
| 2004/0025057 | A1 | * | 2/2004 | Cook | 713/201 |
| 2004/0139314 | A1 | * | 7/2004 | Cook et al. | 713/151 |
| 2004/0249817 | A1 | * | 12/2004 | Liu et al. | 707/9 |
| 2005/0021803 | A1 | * | 1/2005 | Wren, III | 709/231 |
| 2006/0288211 | A1 | * | 12/2006 | Vargas et al. | 713/170 |

OTHER PUBLICATIONS

"Oracle9i Lite Developer's Guide for AQ Lite, Release 5.0, Part No. A90251-01".*
Oracle9i Lite Developer's Guide for AQ Lite, Release 5.0, Part No. A90251-01, Sep. 24, 2010.*
"Oracle9i Lite Developer's Guide for AQ Lite", Release 5.0, Part No. A90251-01, www.download.oracle.com-docs-html-A90251_01-aqintr.htm, accessed Sep. 24, 2010, 13 pages.

* cited by examiner

*Primary Examiner* — Kambiz Zand
*Assistant Examiner* — Yonas Bayou
(74) *Attorney, Agent, or Firm* — Woodcock Washburn LLP

(57) ABSTRACT

Systems and methods are disclosed that facilitate identifying messages generated on a mobile device while the device is offline as requiring encryption, storing the messages in a message outbox with a flag indicating that encryption is required, and identifying recipients of the flagged messages to generate a recipient list. The recipient list can be piggybacked on a server synchronization request when the mobile device enters a period of online activity, and a server can return public keys associated with identified recipients to permit an encryption component, such as a secure/multipurpose Internet mail extension protocol (S/MIME) encryption component, in the mobile device to encrypt the messages.

20 Claims, 13 Drawing Sheets

DYNAMICALLY RESOLVING RECIPIENTS TO RETRIEVE PUBLIC KEYS DURING SEND/RECEIVE

CROSS REFERENCE TO RELATED APPLICATION

This application is a continuation of U.S. application Ser. No. 11/144,896, filed Jun. 3, 2005 entitled "Dynamically Resolving Recipients To Retrieve Public Keys During Send/Receive," the entirety of which is incorporated herein by reference.

BACKGROUND

Computers and computer-based devices have become a necessary tool for many applications throughout the world. Typewriters and slide rules have become obsolete in light of keyboards coupled with sophisticated word-processing applications and calculators that include advanced mathematical functions/capabilities. Moreover, computers that were once used solely for analyzing data have, over time, been transformed into multi-functional, multi-purpose machines utilized for contexts ranging from business applications to multi-media entertainment. Costs of such computing mechanisms have also trended downward, rendering personal computers ubiquitous throughout many portions of the world.

While computers and personal computing devices have pervaded society as a means of communication, a need has grown substantially for ways in which to protect information transmitted between computing devices. For example, most modern email and/or text messaging systems employ some form of encryption in order to ensure that unintended recipients cannot view the content of the message. There are two main forms of encryption: symmetric encryption and asymmetric encryption. The latter form is also known as "public-key" encryption.

A cryptographic system, for instance, uses two keys to encrypt a message. A public key associated with an intended recipient, which is known to all users of the messaging system, can be employed by a sender to initially encrypt the message, and an intended recipient can be endowed with a private key, known only to the intended recipient, to download/decrypt the message. A major drawback of public-key encryption systems is that a device must always be connected to a messaging server in order to retrieve a public key when a user sends a message intended for encryption.

Accordingly, an unmet need exists in the art for systems and/or methodologies that overcome the aforementioned deficiencies.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention, according to an aspect thereof, comprises a method of dynamically retrieving public keys for message encryption during a send/receive process. The method comprises identifying a message to be encrypted and storing the message in a message outbox in a mobile device while the device is offline, and retrieving a public key for a recipient associated with the stored message when the mobile device enters a period of online activity. Intended recipients of such messages can be identified as the mobile device goes online, and a list thereof can be generated and appended to a server synchronization request to query certificates and/or public keys for recipients identified in the list. Upon receipt of public keys returned by the server, messages can be encrypted using a secure/multipurpose Internet mail extension (S/MIME) encryption protocol and transmitted to their respective intended recipients.

In another aspect, messages generated in an offline mobile device and intended for encryption can be flagged for encryption at a later time, such as when the mobile device synchronizes with a server. Upon synchronization, a certificate query can be piggybacked on a server synchronization request, and a resolution component can issue a command to the server resolve recipients identified in the query. The server can then return public keys need for encryption of messages to be sent to respective recipients. In the event that the server is unable to resolve one or more of the recipients and/or return a public key there for, an error message can be generated and stored in a message inbox in the mobile device to alert a user of the device that the message was not transmitted. Additionally, the unencrypted message can be stored in a "drafts" folder in the mobile device to permit the user to retrieve the message draft for later transmission, with or without encryption.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF ILLUSTRATIVE EMBODIMENTS

Figure 1:
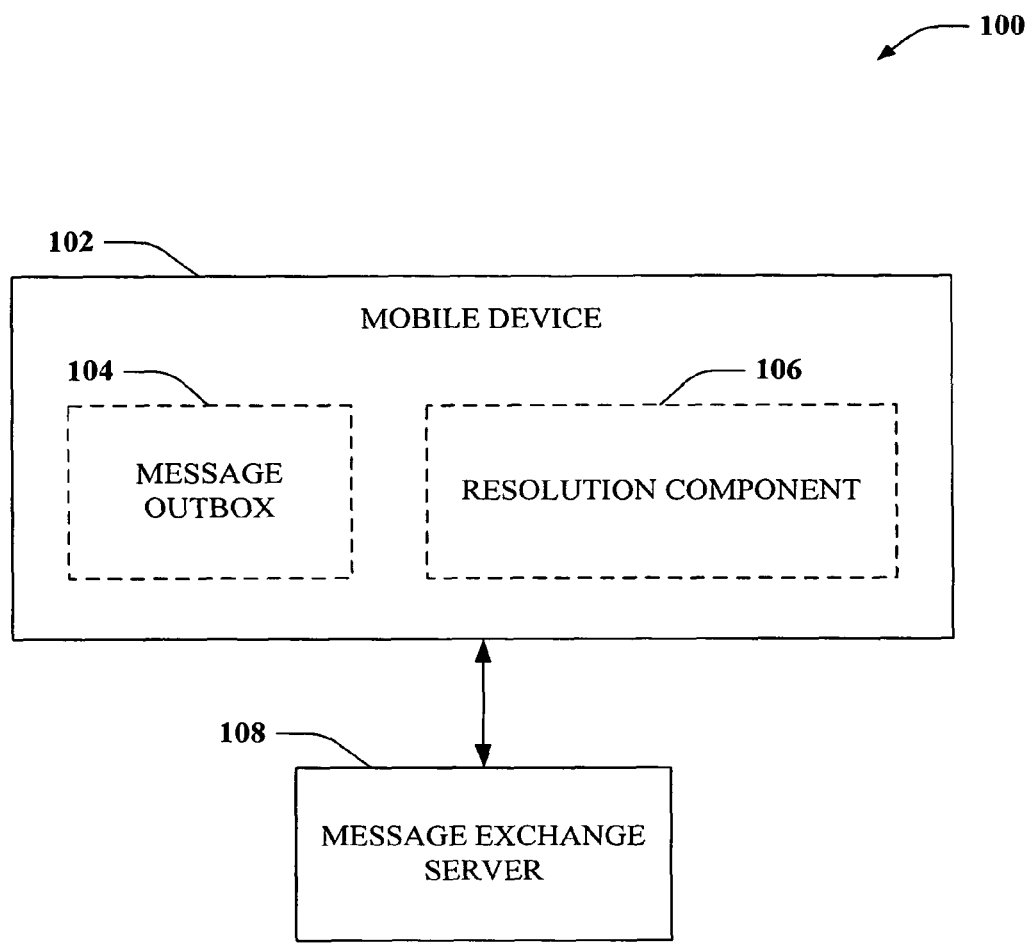
FIG. 1 illustrates a system that facilitates retrieving recipient public keys during synchronization of a mobile device with a communication network.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The subject invention disclosed and claimed herein, in one aspect thereof, comprises a system that facilitates dynamically retrieving public keys during send/receive processes on mobile devices. For conventional "always-online" secure/multipurpose Internet Mail Extension (S/MIME) clients, such as a desktop email exchange, etc., a recipient's public keys can be immediately retrieved from a server. However, mobile devices often operate in conjunction with a network that provides intermittent connections. In such cases, a user of a mobile device can compose a message and initiate a send/receive action (e.g., the user can hit "send," . . . ); however, if no network connection is available, then the mobile device cannot retrieve the recipient's public key to encrypt the message. The subject invention permits "piggybacking" a network connection for an off-line mobile device on an existing network connection to retrieve necessary public keys. For example, when a user of a mobile device (e.g., a cellular phone, a laptop, a PDA, . . . ) opts to transmit an encrypted message, the message can be saved in a data store, such as an outbox and the like, with a special property (e.g., a flag, . . . ) that indicates that the message is to be encrypted and requires one or more public keys. When the client, mobile device, etc., synchronizes with the network and the synchronization process is ready to send outgoing messages from the outbox, a synchronization application programming interface (API) can be called, which can identify intended recipients associated with messages in the outbox and add recipients of messages flagged for encryption to a server synchronization request to retrieve certificates for the recipients. Once all recipients of messages to be encrypted have been added to the request, a command can be issued to the exchange server to resolve the recipients against the server and return a public key for each recipient, which can be employed to encrypt the message associated with each recipient using, for example, an S/MIME encryption protocol. Thus, messages intended to be encrypted can be encrypted at transmission time while messages not intended to be encrypted can concurrently be transmitted in unencrypted format (e.g., plain text, . . . ). Moreover, in a scenario in which a public key is not discernable for a recipient and/or a recipient name is ambiguous, an error message can be returned to the user of the mobile device.

Referring now to FIG. 1, there is illustrated a system 100 that facilitates retrieving recipient public keys during synchronization of a mobile device with a communication network. The system 100 can comprise a mobile device 102 (e.g., a cellular phone, a laptop, a PDA, etc.) that is operatively associated with a message exchange server 108 (e.g., an email server, etc.). The mobile device 102 can comprise typical mobile device components, and in particular, a message outbox, or data store, 104. Additionally, the mobile device 102 can comprise a resolution component 106 that facilitates resolving public keys for intended message recipients when messages stored in the outbox 104 require encrypting. For example, an always-connected message exchange client, such as an email client on a desktop, etc., can typically immediately retrieve a recipient's public key from a message exchange server as needed to encrypt a message being sent to the recipient. However, a device that has intermittent network connection availability, such as the mobile device 102, can endure periods during which connectivity to the network is unavailable, which in turn limits the ability of the device to retrieve a public key to encrypt a message for an intended recipient. For instance, a user can generate an email message for a recipient, wherein the message is intended to be encrypted for the recipient, and the user can initiate message transmission (e.g., by depressing a "send" button on a cell phone or the like). However, if there is no connection available, the mobile device will be unable to encrypt the message because it cannot retrieve the public key associated with the particular intended recipient.

The resolution component 106 can detect a generated message that is to be encrypted and can store the message in the outbox 104 with an identifier (e.g., a flag, property, etc.) associated therewith to indicate that the message will require a public key for encryption upon a next online session for the mobile device 102. The next time the mobile device 102 synchronizes with the server 108, the resolution component 106 can piggyback a query requesting public keys for recipients of flagged messages in the outbox (e.g., messages that require encryption) upon a synchronization request transmitted from the mobile device 102 to the server 108. Thus, upon initiation of a send/receive action (e.g. an online communication event), the server 108 can be queried to retrieve necessary public keys.

According to this example, when a user opts to transmit an encrypted message, the message can be saved in the outbox 104 with a special property (e.g., flag, metadata description, etc.) set such that the property indicates that the message is to be encrypted and therefore requires public keys. When the mobile device 102 synchronizes with the server 108, a synchronization process is ready to transmit outgoing messages from the outbox 104, and the resolution component 106 can call an application process instruction (API) that scans all flagged outgoing messages to identify recipients thereof. The API can additionally add recipient information (e.g., recipient email alias, device identity information, etc.) to a server synchronization request generated by the synchronization process. Once identified recipients have been added to the server synchronization request, the resolution component 106 can issue a "ResolveRecipients" command (e.g., another API) to the exchange server 108, which instructs the server 108 to return the required certificates, public keys, etc., to permit encryption of the flagged outgoing messages. Additionally, if no public key is available for a given recipient, the ResolveRecipients API can generate an error message for the mobile device 102.

Figure 2:
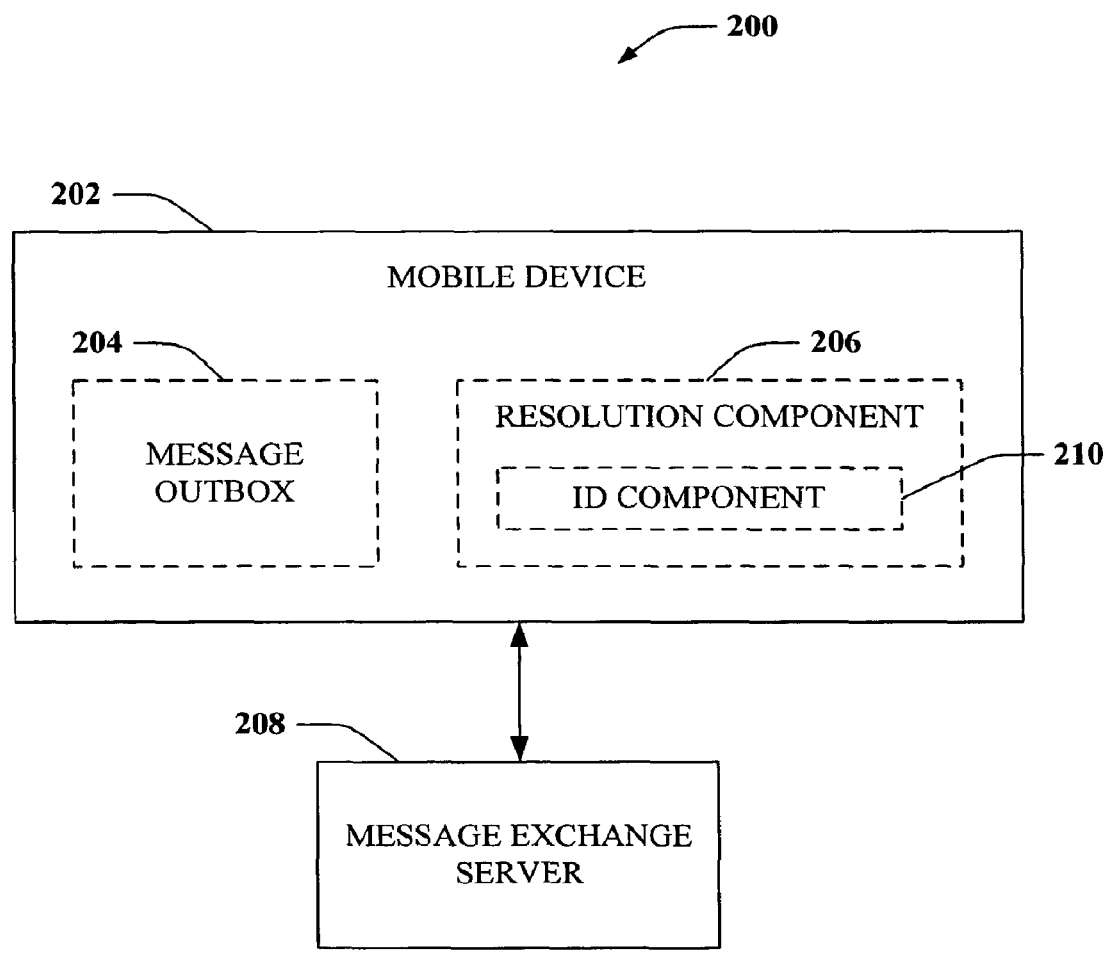
FIG. 2 illustrates a system that facilitates resolving public keys for encrypted message recipients upon synchronization of a mobile device with a message exchange server.

FIG. 2 illustrates a system 200 that facilitates resolving public keys for encrypted message recipients upon synchronization of a mobile device with a message exchange server. The system 200 comprises a mobile device 202 that is operatively coupled to an exchange server 208 and can endure periods of inactivity between periods of active, or online, activity. The mobile device 202 comprises a message outbox 204, or memory, that stores messages generated by a user. For instance, a user can generate one or more messages during an offline period and can hit a send button to transmit the message. However, because the mobile device is offline, such messages will not be immediately sent. Rather, they can be stored in the outbox 204 until a next online session (e.g., when a signal is available to the mobile device, . . . ). Additionally, if a message is to be encrypted, the message can be flagged as such for later encryption, as the mobile device 202 will be unable to retrieve a public key to encrypt the message during an offline period.

The mobile device 202 further comprises a resolution component 206 that facilitates retrieving public keys for encrypted messages in the outbox 204 when the mobile device 202 synchronizes with the server 208 at the beginning of an online session. The resolution component 206 can comprise an identification component 210 that assesses flagged messages in the outbox at runtime (e.g., during synchronization with the server 208) to identify recipient names, email aliases, and the like. Recipient names associated with messages that require encryption can be added to a server synchronization request generated by the resolution component 206 to facilitate piggybacking a query on the initial synchronization request at the beginning of an online communication session to retrieve required public keys. The resolution component 206 can then generate a query to retrieve public keys associated with the identified recipients, which can be appended to a synchronization request transmitted from the mobile device 202 to the server 208 during synchronization. Upon receipt of the public keys for the identified recipients, respective messages can be encrypted (e.g., using an S/MIME protocol or the like) and transmitted to the server 208 for delivery to the intended recipients. It will be appreciated that other messages that do not require encryption can be stored in the outbox 204 during an offline period and transmitted along with encrypted messages during a next online period.

Figure 3:
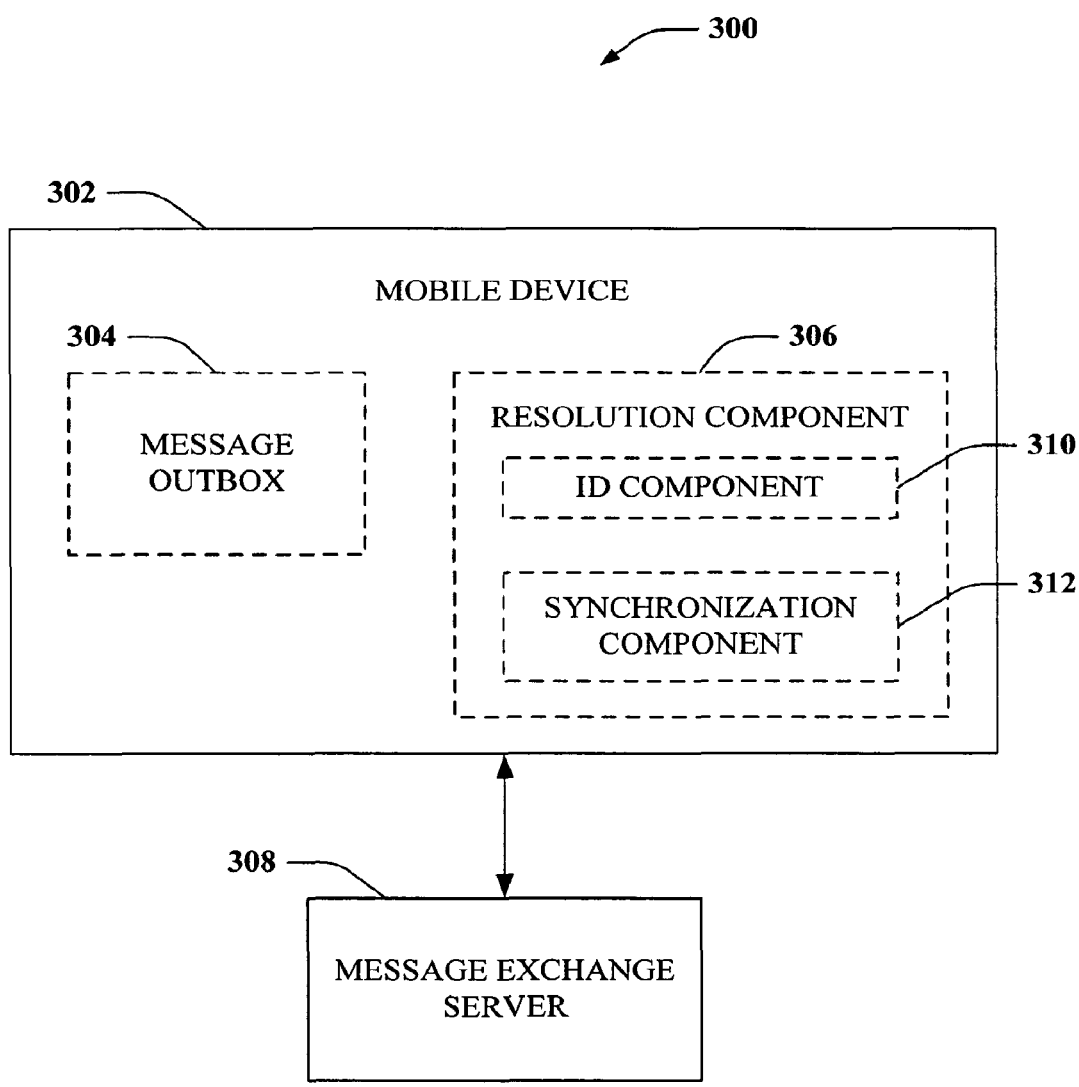
FIG. 3 is an illustration of a system that facilitates encrypting a message generated on a mobile device during a period of offline activity, wherein the message is flagged for encryption and stored until a subsequent period of online activity when public keys associated with the stored messages can be retrieved for encryption.

FIG. 3 is an illustration of a system 300 that facilitates encrypting a message generated on a mobile device during a period of offline activity, wherein the message is flagged for encryption and stored until a subsequent period of online activity in which public keys associated with the stored messages can be retrieved for encryption. The system 300 comprises a mobile device 302 (e.g. a cellular phone, laptop, PDA, and/or any other suitable device that experiences intermittent online activity, . . . ), which is operatively coupled to a message exchange server 308. The mobile device 302 comprises a resolution component 306, which in turn is operatively associated with an identification component 310 and a synchronization component 312. The identification component 310 can identify recipients of messages flagged by the resolution component 306 as requiring public keys for encryption purposes. Recipient information can then be employed by the resolution component 306 to append a public key query to a synchronization request generated by the synchronization component 312 when the mobile device 302 initiates a period of online activity (e.g., upon entering a communication service area, receiving an indication of a communication bandwidth availability, . . . ).

According to an example, a user of the mobile device 302 can generate a message (e.g., email, . . . ) thereon, and the resolution component 306 can assess policy settings to determine whether the message requires signing and/or encryption. Global and/or local user settings can be assessed to determine whether signing and/or encryption are required as well, and, if the message generated on the mobile device 302 is a reply to a received message, such assessment can be superceded by settings on the received message. When the message is stored in the outbox 304 before being sent, it needs to be encrypted so third parties cannot view the message. A privately-defined PR_CE_NEEDS_CERTS property can be set on the message so that the message is marked as requiring certificates and/or public keys to be properly encrypted. When a send/receive action is initiated, the synchronization component 312 can call an API such as, for instance, IMailCertification::GetCerts, before synchronizing the outbox 304.

The API IMailCertification::GetCerts can assess messages in the outbox 312 and identify messages that need to be encrypted. Recipient lists associated with flagged messages can be generated, and the API can add unique recipients to an IResolveRecipients object provided by the synchronization component 312. A stream of data generated by the IResolveRecipients object can be transmitted to the exchange server 308, and, upon receiving a response there from, the IResolveRecipients object can unpack an XML description and ascertain certificates for each individual recipient. Such certificates can be associated with their respective messages in the outbox 312. Once all necessary certificates/public keys for a message have been retrieved, the message can be encrypted. Messages for which certificates could not be obtained can be stored in a drafts store (not shown), and the user of the mobile device 302 can be alerted to the error. The following pseudo code is illustrative of code that can be employed to implement the foregoing: TABLE-US 00001//Get SyncMgr handle and credentials SyncMgrOpen(&hSyncMgr, NULL, GUID_NULL); SyncMgrGetConnInfo(hSyncMgr, &ConnInfo); //Decrypt password, then set the credentials//This will cause them to be sent to the server upon//connecting SyncMgrSetConnInfo(hSyncMgr, &ConnInfo); //Use ConnInfo.hConnection to establish server connection//Use IResolveRecipients to build stream CoCreateInstance (CLSID_ResolveRecipients, NULL, CLSCTX_ INPROC_SERVER, IID_IResolveRecipients, &pResolveRecipients); //For each recipient . . . pResolveRecipients->BuildRequest(pStreamSend, pszRecip, &options); //Send stream to server SyncMgrSend(hSyncMgr, NULL, NULL, pStreamSend, pStreamReceive, ct_NONE, NULL, 0, 0, TEXT("OPTIONS")); //Obtain each individual response, which will provide a//IMassResRecipsResponse interface// Call GetNextResponse in loop to get next recipient pResolveRecipients->ParseResponse(pStreamReceive, &status); pResolveRecipients->GetFirstResponse(&pResponse); //Assess recipient name to determine recipient identity//and match with the appropriate message(s) in Outbox pResponse-> GetTo(&pszTo); //Obtain the certificates. Could be more than one//recipient here (in the case of a DL), so this is//in a loop using GetFirstRecipient and GetNextRecipient pResponse->GetFirstRecipient(&pRecip); pRecip->GetRecipientStatus(&status, &cCert, &cRecips); //Obtain each certificate, again with a loop using//GetFirstCertificate and GetNextCertificate pRecip->GetFirstCertificate(&lpbCert, &cbCert, &fMini);

It will be appreciated that the exchange server 308 can search for requested certificates in an active directory as well as in the user's contact list. In this manner, the server 308 can permit the resolution component 306 to facilitate sending encrypted messages to recipients both internal to a messaging environment (e.g., within a corporation, . . . ) and external to the particular environment in which the system 300 is employed.

Figure 4:
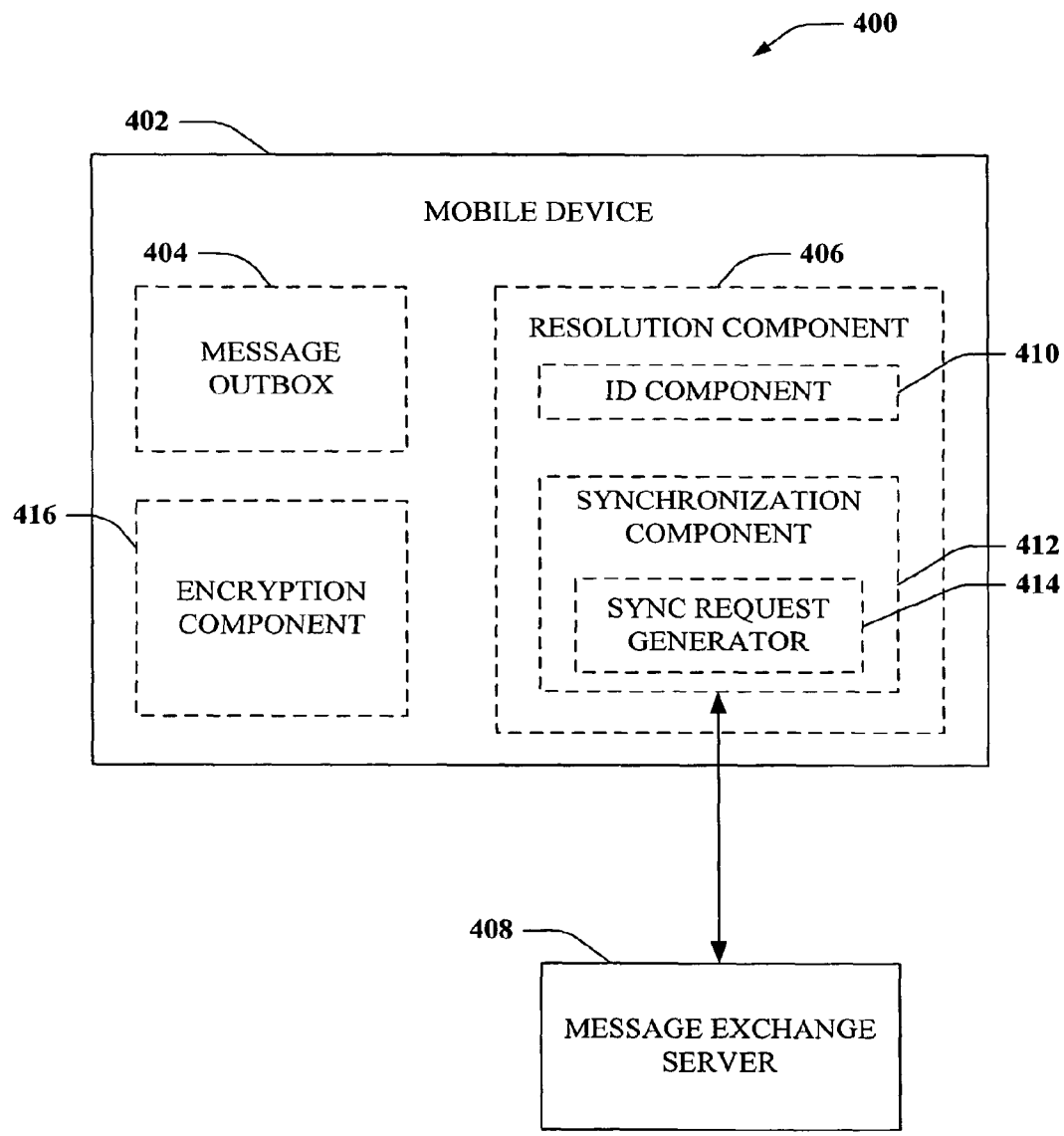
FIG. 4 is an illustration of a system that facilitates retrieving certificates for recipients for which messages are generated during an offline period on a mobile device to permit encryption of the messages when the mobile device enters a subsequent period of online activity.

FIG. 4 is an illustration of a system 400 that facilitates retrieving certificates for recipients for which messages are generated during an offline period on a mobile device to permit encryption of the messages when the mobile device enters a subsequent period of online activity. The system 400 comprises a mobile device 402 operatively associated with a message exchange server 408 to and from which the mobile device 402 can send and receive messages (e.g., emails, . . . ). The mobile device 402 comprises a message outbox 404 that can store generated messages during an offline period until the mobile device 402 enters an online period, and a resolution component 406 that facilitates resolving recipient identities against the server 408 to retrieve public keys for recipients upon synchronizing with the server 408 when an online period is initiated. The resolution component 406 comprises an identification component 410 and a synchronization component 412, similar to components described with regard to FIG. 3. The resolution component 406 further comprises a synchronization request generation component 414 that generates a synchronization request when the mobile device 402 enters a period of online activity, in order to synchronize the mobile device with the server 408.

A user can generate one or more email messages on the mobile device 402 during an offline period, and can "send" the messages (e.g., by depressing a "send" button on the mobile device, . . . ), at which time user interaction with the mobile device with respect to a particular message can be terminated. However, because the mobile device 402 is not online when the user sends the message, the message can be stored the message outbox 404. The resolution component 406 can assess whether the message requires encryption and can set a flag or property on the message in the outbox 404 to indicate that the message will require a public key to be retrieved to encrypt the message on a next online session.

When the mobile device 402 goes online, the ID component 410 can assess messages stored in the outbox 404 and identify messages flagged as requiring encryption. The ID component 410 can additionally assess a recipient to whom a flagged message is addressed and can generate a list of such recipients. When the synchronization component 412 recognizes that the mobile device 402 is going online, it can instruct the sync request generator 414 to initiate a synchronization request to the server 408. The resolution component 406 can add a certificate query comprising the recipient identities determined by the ID component 410 to the sync request generated by the sync request generator 414. In this manner, a certificate query can be piggybacked on the initial sync request, thereby mitigating a need for a separate certificate request at some point after synchronization, which in turn facilitates providing a richer, more robust, and more efficient messaging system to a user of the mobile device 402.

The mobile device 402 additionally comprises an encryption component 416 that can encrypt a messaged flagged for encryption upon retrieval of a public key associated with the recipient of the message by the resolution component 406. The encryption component 416 can employ the public key and/or certificate associated with a user identified as an intended recipient of a flagged message in the outbox 404. The encryption component 416 can be, for example, an S/MIME encryption component. S/MIME is a protocol that encrypts and/or appends digital signatures to MIME messages. MIME is regarded as an official proposed standard format for email generation.

Figure 5:
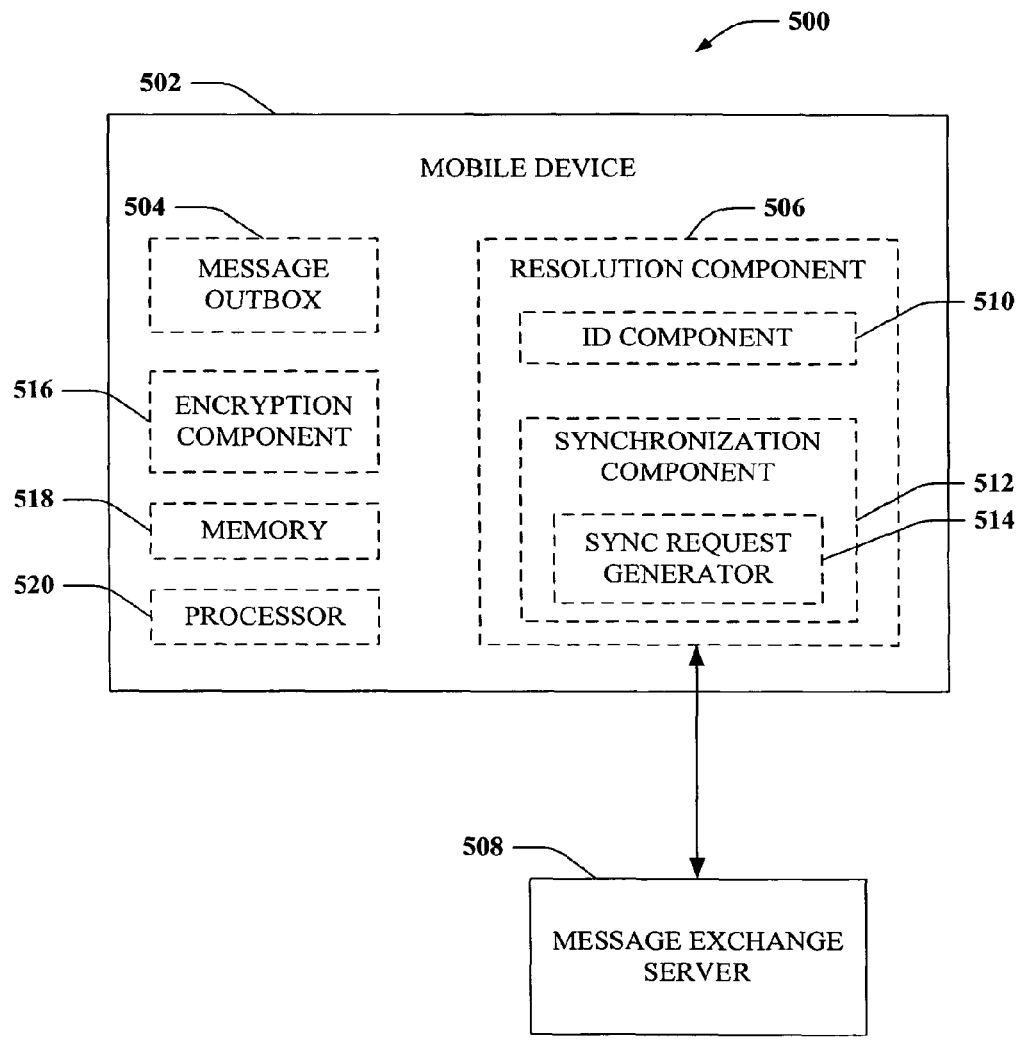
FIG. 5 is an illustration of a system that facilitates retrieving encryption keys upon synchronization of a mobile device with a message server.

FIG. 5 is an illustration of a system 500 that facilitates retrieving encryption keys upon synchronization of a mobile device with a message server. The system 500 comprises a mobile device 502 that is operatively coupled to a message exchange server 508 in a manner such that the mobile device 502 has intermittent connectivity with the server 508 (e.g., the mobile device is not always online, . . . ). The mobile device can comprise a message outbox 504 and a resolution component 506, as described supra with regard to the preceding figures. The resolution component 506 assesses whether a message generated by a user during an offline period requires encryption, and flags the message by setting a unique property on the message and stores the message in the outbox 504. The resolution component 506 comprises an ID component 510 that identifies a recipient associated with a flagged message, and a synchronization component 512 that detects when the mobile device 502 is entering an online period. The synchronization component 512 further comprises a synchronization request generator 514 that provides a request to the message server 508 to synchronize the mobile device 502 with the server 508 upon entry into an online session. When the sync component 512 determines that the mobile device 502 is about to go online, the identification component 510 can assess messages in the outbox 504 and can identify recipients associated with flagged messages. The resolution component 506 can then add recipient information to the server sync request generated by the sync request generator 514 and thereby piggyback a certificate query on the sync request. The server 508 can then return certificates and/or public keys required for encryption regarding recipients identified in the certificate query. Upon receipt of the necessary certificates, an encryption component 516 can encrypt the flagged messages, which can be transmitted to the server 508.

The mobile device additionally comprises a processor 518 and a memory 520. It is to be appreciated that the processor 518 can be a processor dedicated to analyzing and/or generating information received by the mobile device 502 and/or components thereof, a processor that controls one or more components of the system 500, and/or a processor that both analyzes and generates information received by the mobile device 502 and/or components thereof and controls one or more components of the system 500.

The memory 520 can additionally store protocols associated with generating synchronization requests, certificate queries, recipient lists, messages, flags for messages requiring public keys for encryption, etc., such that the system 500 can employ stored protocols and/or algorithms to achieve retrieving necessary public keys upon synchronization as described herein. It will be appreciated that the memory 520 component described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 520 of the subject systems and methods is intended to comprise, without being limited to, these and any other suitable types of memory.

Figure 6:
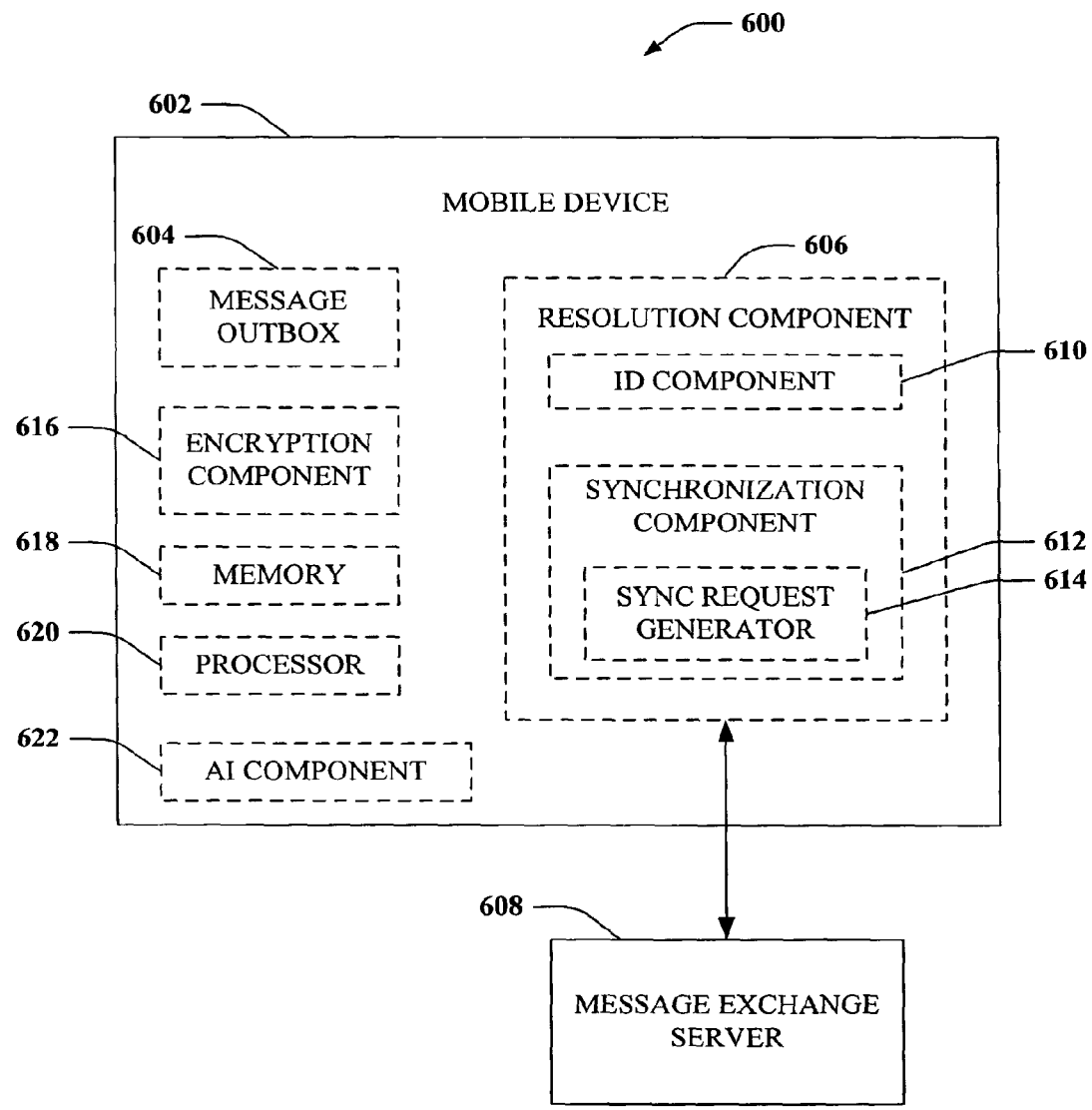
FIG. 6 illustrates a system that facilitates retrieving public keys upon entering an online period for messages requiring encryption and generated during an offline period in a mobile device.

FIG. 6 illustrates a system 600 that facilitates retrieving public keys upon entering an online period for messages requiring encryption and generated during an offline period in a mobile device. The system 600 comprises a mobile device 602 operatively coupled to a message exchange server 608, wherein the mobile device 602 has an intermittent connection (e.g., offline and online periods of activity) to the server 608. The mobile device 602 comprises an outbox 604 that stores messages to be transmitted during a next online session, and a resolution component 606 that facilitates identifying messages that require encrypting and retrieving public keys for recipients of such messages to permit message encryption upon a next synchronization of the mobile device 602 with the server 608. The resolution component 606 comprises an identification component 610 that identifies recipients of messages that are flagged as requiring encryption, a synchronization component 612 that identifies when an online session is being initiated, and a synchronization request component 614 that generates a synchronization request at the inception of the online session to synchronize the mobile device 602 to the server 608. The resolution component 606 can append recipient information generated by the identification component 610 to the server synchronization request to effectively piggyback a query for public keys associated with the recipients of flagged messages stored in the outbox 604, in order to resolve certificate issues and permit an encryption component 616 to encrypt flagged messages for transmission during the online session. The mobile device 602 comprises a processor 618 and a memory 620, as described above with regard to FIG. 5.

The mobile device 602 additionally comprises an artificial intelligence (AI) component 622 that can make inferences regarding an appropriate course of action during public key resolution and/or message encryption, etc. As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, the AI component 622 can determine that ambiguity exists between one or more public keys returned by the server 608 in response to a certificate query appended to an initial synchronization request at the inception of an online session. The AI component 622 can resolve such ambiguity by, for example, assessing a list of previously messaged recipients and identifying a more frequently identified recipient as being the recipient with whom the public key is intended to be associated. According to another example, the AI component 622 can infer an appropriate course of action upon a determination that a public key is unavailable for a given flagged message in the outbox 604. In such a scenario, it can be determined that a last known public key for the recipient associated with the orphan flagged message can be an appropriate public key with which to attempt encryption of the message. Additionally, in such a scenario, the AI component can infer that saving the message to a "drafts" folder and alerting the user to the error is a most desirable course of action. It will be appreciated that the foregoing examples are illustrative in nature and are not intended to limit the scope or number of inferences that can be made by the AI component 622 or the manner in which such inferences are made.

Figure 7:
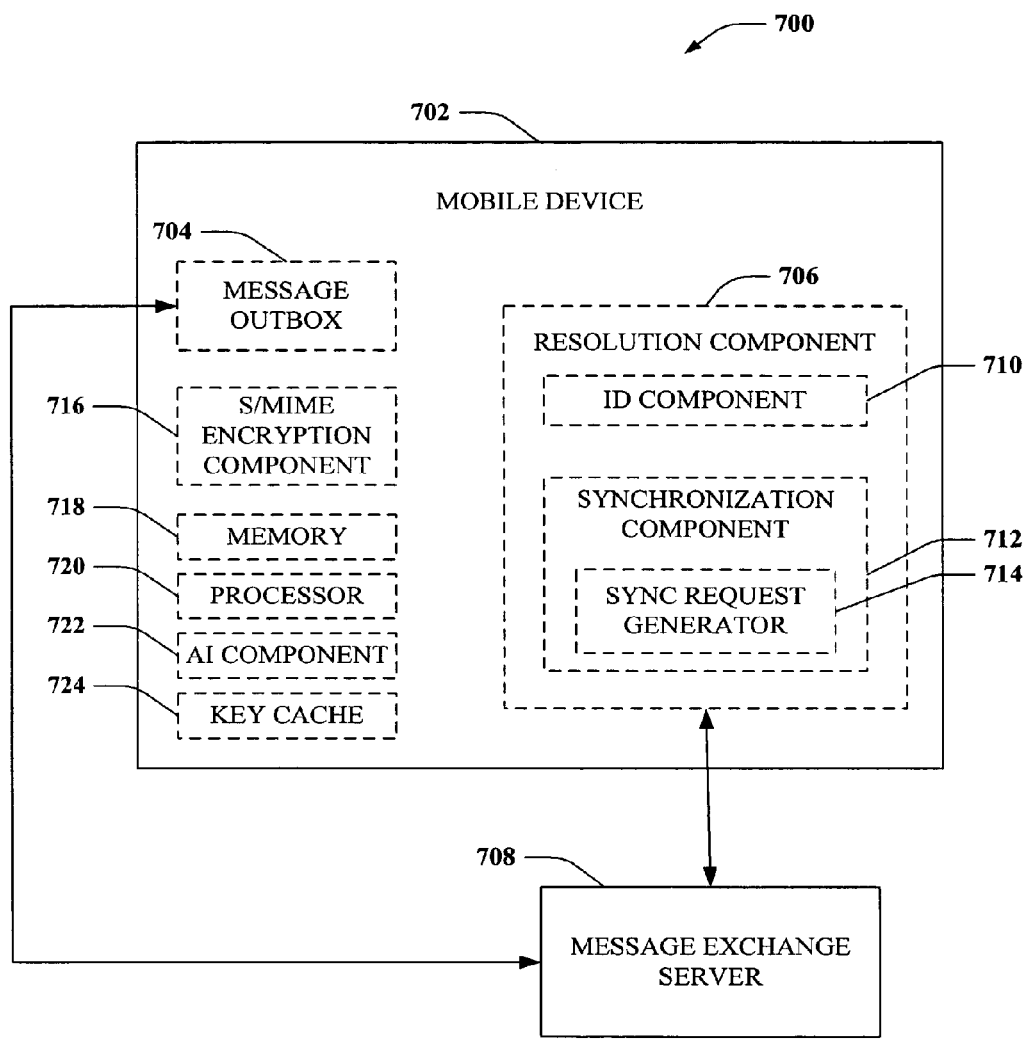
FIG. 7 is an illustration of a system that facilitates generation of messages that require encryption during an offline session on a mobile device and retrieving public keys for such messages upon initiation of an online session on the mobile device.

FIG. 7 is an illustration of a system 700 that facilitates generation of messages that require encryption during an offline session on a mobile device and retrieving public keys for such messages upon initiation of an online session on the mobile device. The system 700 comprises a mobile device 702 and a message exchange server 708 wherein the mobile device 702 has an intermittent connection to the server 708. The mobile device 702 comprises an outbox 704 and a resolution component 706, which further comprises an ID component 710, a synchronization component 712, and a server synchronization request generator 714 as detailed with regard to the preceding figures. The mobile device 702 further comprises an S/MIME encryption component 716 that employs a secure MIME protocol to encrypt messages flagged for encryption and stored in the outbox 704, and a processor 718, memory 720, and AI component 722 as described above.

The mobile device 702 can additionally comprise a key cache 724 (e.g., a memory, data store, . . . ) that can store recently employed public keys, frequently employed public keys, and the like, as well as recipient information associated therewith. For example, a user employing the mobile device 702 can generate messages while the mobile device is offline, and such messages can be stored in the outbox 704 until the device goes online again. If a message requires encryption, the resolution component 706 can set a flag on the message while it is stored in the outbox 704. When the synchronization component 712 determines that the mobile device 702 is receiving sufficient bandwidth to communicate with the server 708, the ID component 710 can assess flagged messages in the outbox and provide a list of recipients whose public keys are required (e.g., need to be retrieved from the server) in order to encrypt the flagged messages in the outbox 704 prior to transmission. The resolution component 706 can generate a certificate query and append it to a server synchronization request generated by the request generator component 714 upon initiation of an online session for the mobile device 702. In this manner, certificates for encryption keys can be requested by the mobile device 702 upon synchronization rather than at some time after synchronization has occurred, thereby providing a more efficient communication session for a user than can be provided by conventional systems.

Recently and/or frequently used public keys and/or certificates can be stored in the key cache 724 to facilitate ambiguity resolution in a scenario in which the server 708 returns an indication that a requested public key is unavailable. For instance, a user of the mobile device 702 can have one or more recipients (e.g., a supervisor, a secretary, a colleague, . . . ) to whom messages are transmitted with higher frequency than other recipients. Public keys for such recipients can be stored in the key cache 724, and, should the server 708 return an indication that a public key for one of the recipients is unavailable, the AI component 722 and/or processor 720 can determine that a most recent public key stored in the key cache 724 should be employed to encrypt the message. A determination of which keys are to be cached can be made based at least in part on, for example, a number of messages generated for the specific recipient associated with the public key in a given time period (e.g., one hour, one day, . . . ). If a recipient's public key is employed at a frequency equal to or greater than a predetermined threshold frequency, the key can be stored in the key cache 724. Additionally and/or alternatively, a predetermined number of most recent keys can be stored in the key cache 724 in a stack format. Additionally, the server 708 can assign a period for which a key's validity is guaranteed. In this manner, the device 702 can safely cache the public key in the key cache 724 without having to determine whether it has expired or has been revoked, until a certain expiration date, after which the device 702 can recheck with the server 708 to get the new status of the public key (e.g., expired, revoked, still valid, . . . ).

With reference to FIGS. 8-11, there are illustrated flowcharts in accordance with aspects of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts can, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 8:
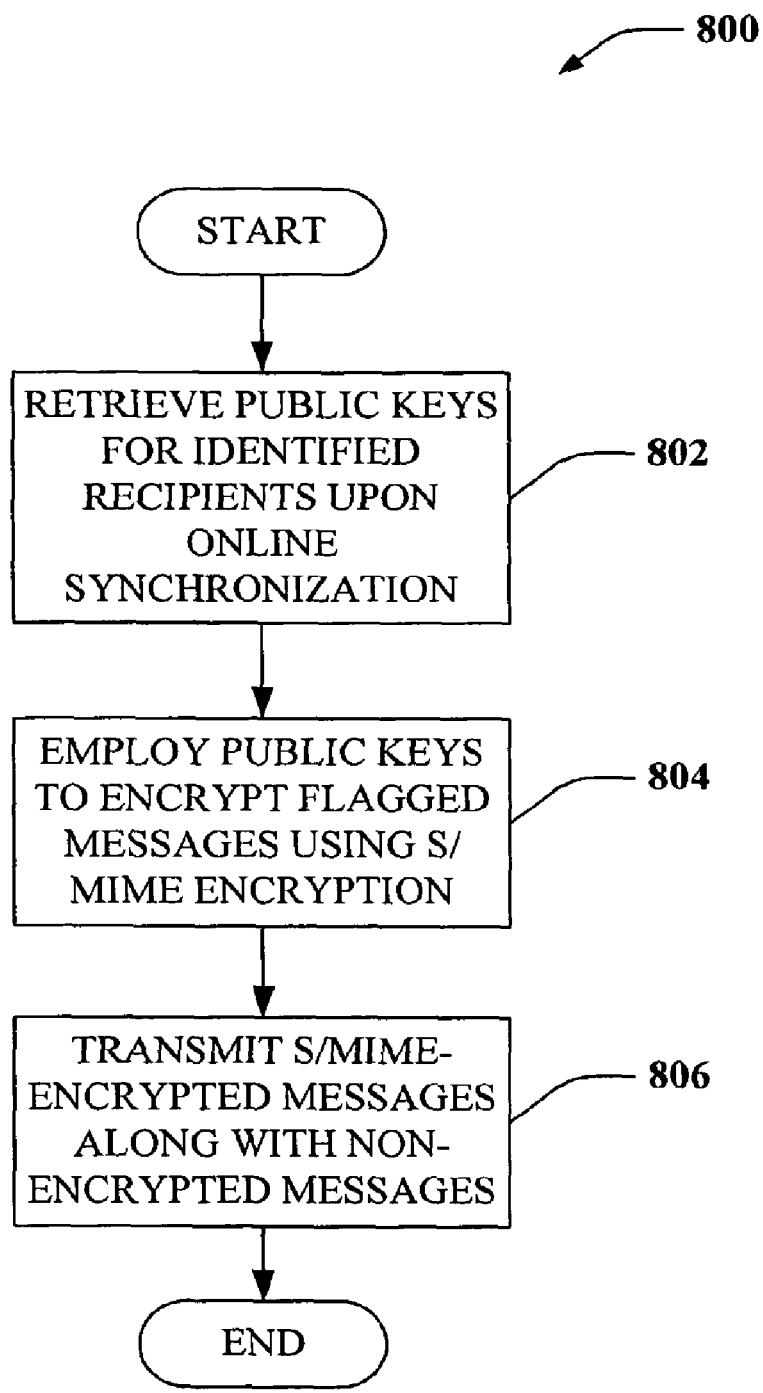
FIG. 8 is an illustration of a methodology for encrypting messages utilizing an S/MIME encryption process for messages generated during an offline period on a mobile device.

FIG. 8 is an illustration of a methodology 800 for encrypting messages utilizing an S/MIME encryption process for messages generated during an offline period on a mobile device. At 802, public keys can be retrieved for messages flagged as requiring encryption. Retrieval of such keys can be performed by identifying recipients of flagged messages and piggybacking a query for such keys on a synchronization request at the beginning of an online session. By appending the request for certificates and/or public keys associated with recipients of the messages flagged for encryption to the server synchronization request at 802, required public keys can be provided by a message exchange server to the mobile device more quickly than can be achieved using conventional methods that generate a separate certificate query at some point after synchronization.

At 804, an S/MIME encryption technique can be performed on flagged messages utilizing public keys returned by the message exchange server. S/MIME is a secure form of email transport that permits a user to verify the identity of a sender and ensure that the message has not been tampered with since composition. Additionally, S/MIME permits messages to be encrypted and/or clear-signed. Clear-signed messages enable a recipient to verify that message as received was sent by the claimed sender and has not been manipulated since sending. The recipient can verify a signature with a copy of the public key utilized to sign the message and the message body itself, along with any attachments. Such encryption protects message contents from being viewed by anyone other than the intended recipient. For instance, only the intended recipient can employ a copy of a private key to open the encrypted message. Additionally, encrypted messages can be read without being completely downloaded. Rather, such messages can be decrypted on a block-by-block basis.

At 806, S/MIME-encrypted messages can be transmitted along with unencrypted messages to their respective recipients. In this manner, messages generated while the mobile device is offline can be quickly encrypted when the device goes online, such that encryption of the messages does not substantially delay transmission of all messages stored in a message outbox in the mobile device. Moreover, the methodology 800 can facilitate transmission of such encrypted messages at relatively low bandwidths.

Figure 9:
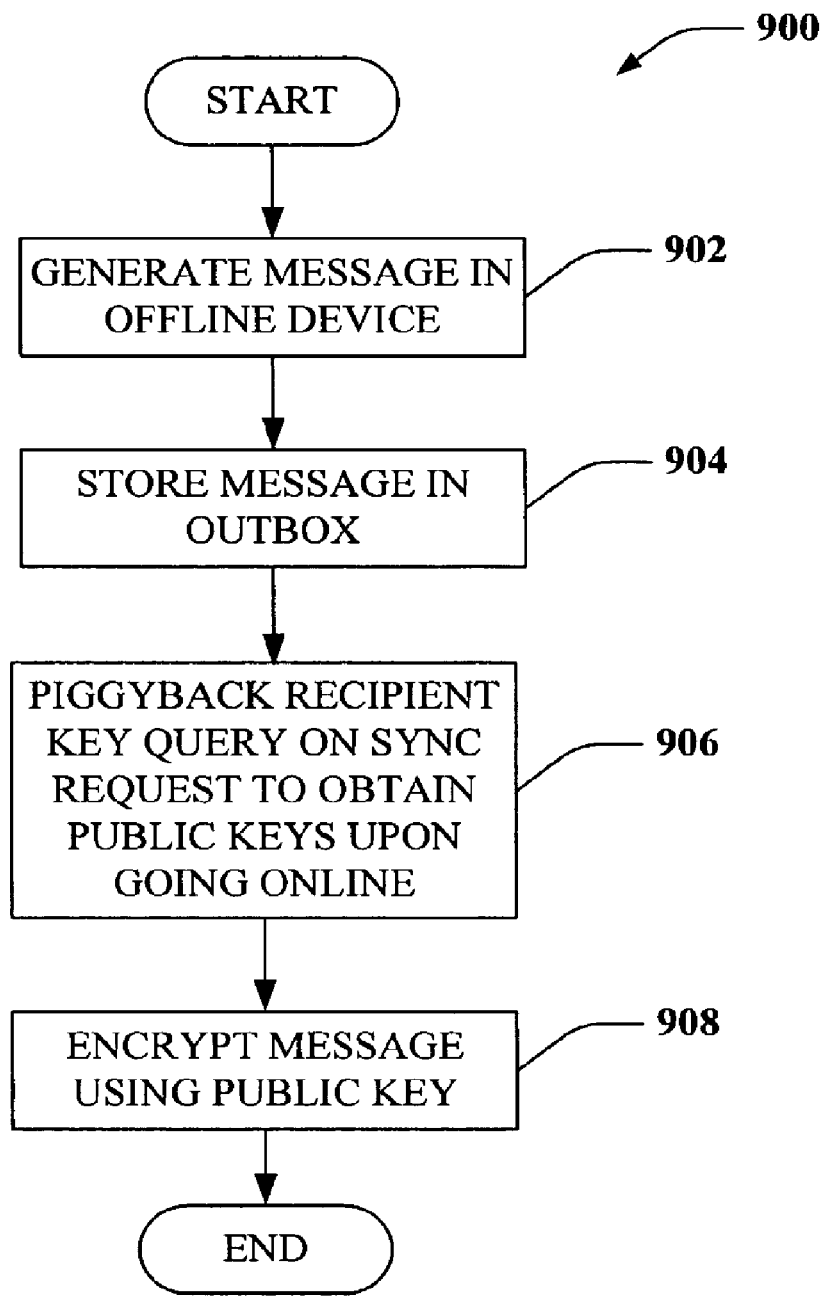
FIG. 9 is an illustration of a methodology for generating messages on a mobile device while the device is offline and retrieving public keys to encrypt messages upon the mobile device going online.

FIG. 9 is an illustration of a methodology 900 for generating messages on a mobile device while the device is offline and retrieving public keys to encrypt messages upon the mobile device going online. At 902, a user can compose a message, such as an email, on a mobile device during an offline period. At 904, the user can complete the message and hit send, which can cause the message to be stored in an outbox in the mobile device for transmission during a next online session for the mobile device. At 906, when the mobile device enters a period of online activity and synchronizes with a message server, the device can append a request for public keys and/or certificates associated with recipients of messages that require encryption, and the server can return such certificates. Upon receipt of the requested certificates, the messages can be S/MIME-encrypted at 908 using the public keys retrieved at 906.

Figure 10:
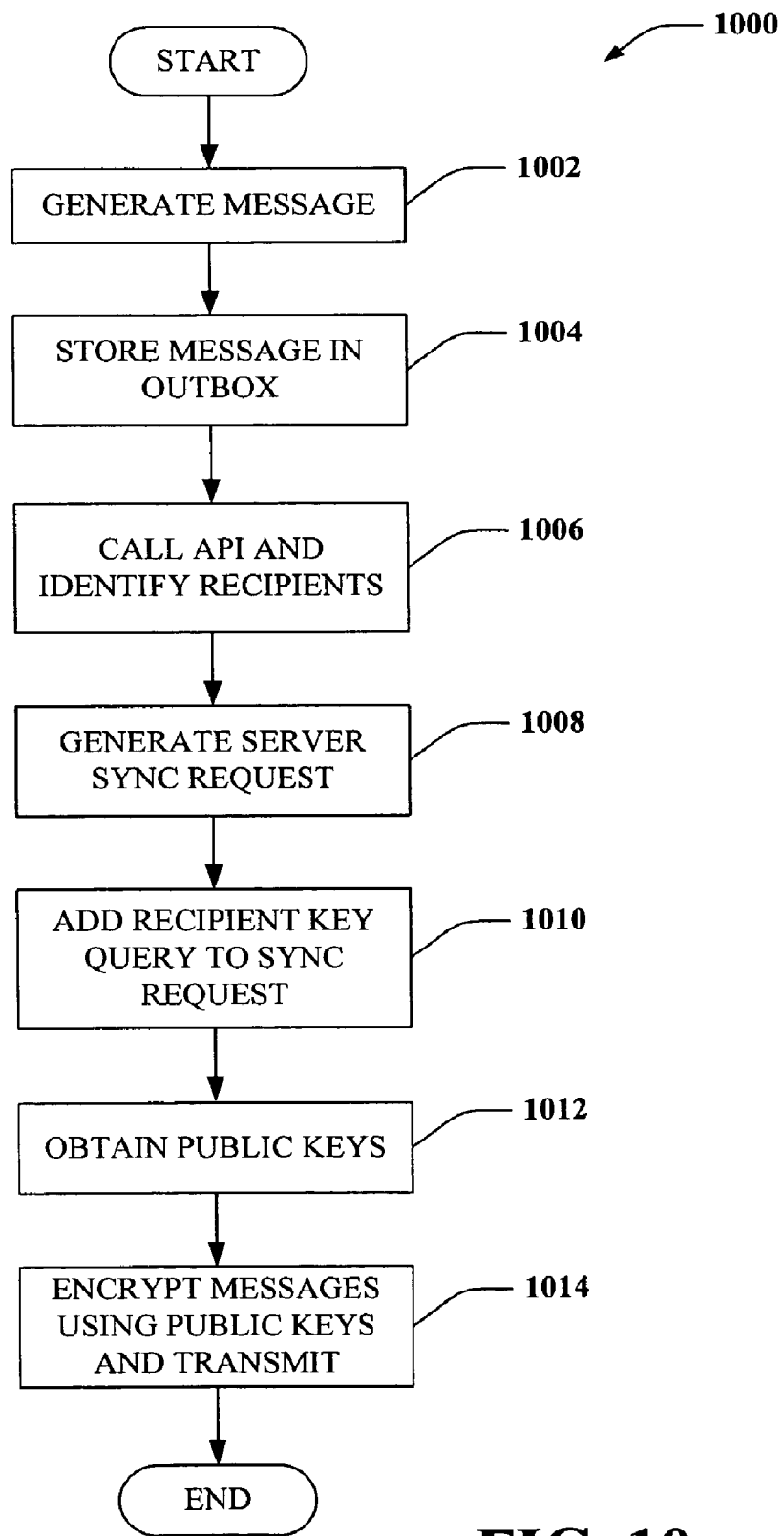
FIG. 10 illustrates a methodology for identifying recipients of encrypted messages generated during an offline period in a mobile device in order to retrieve public keys required for encryption during synchronization of the mobile device with a message exchange server at the inception of a subsequent online communication session.

FIG. 10 illustrates a methodology 1000 for identifying recipients of encrypted messages generated during an offline period in a mobile device in order to retrieve public keys required for encryption during synchronization of the mobile device with a message exchange server at the inception of a subsequent online communication session. At 1002, a user can compose a message requiring encryption while the mobile device is offline. When the user completes the message and hits send, the message is stored in an outbox in the mobile device with a special property that indicates that the message will require public keys for encryption purposes, at 1004. From the user's viewpoint, message generation is complete and the message requires no further user interaction.

When the mobile device goes online (e.g., synchronizes), a call can be made to an API, such as, for example, IMailCert::ProcessOutboxForSMIME, that facilitates identifying a recipient of the message requiring encryption, at 1006. At 1008, a server synchronization request can be generated. At 1010, the API initially called at 1006 can assess all messages in the outbox and can add recipients of messages requiring public keys to the server synchronization request to resolve the recipient list and retrieve the necessary public keys. At 1012, the server can return the requested certificates to the mobile device, and such certificates can be appended to their respective messages to facilitate S/MIME encryption ay 1014. It will be appreciated that a command to resolve recipients can be issued to the server to employ the server to return the appropriate public keys or mini-certificates, which command is described in greater detail below, with regard to FIG. 11.

Figure 11:
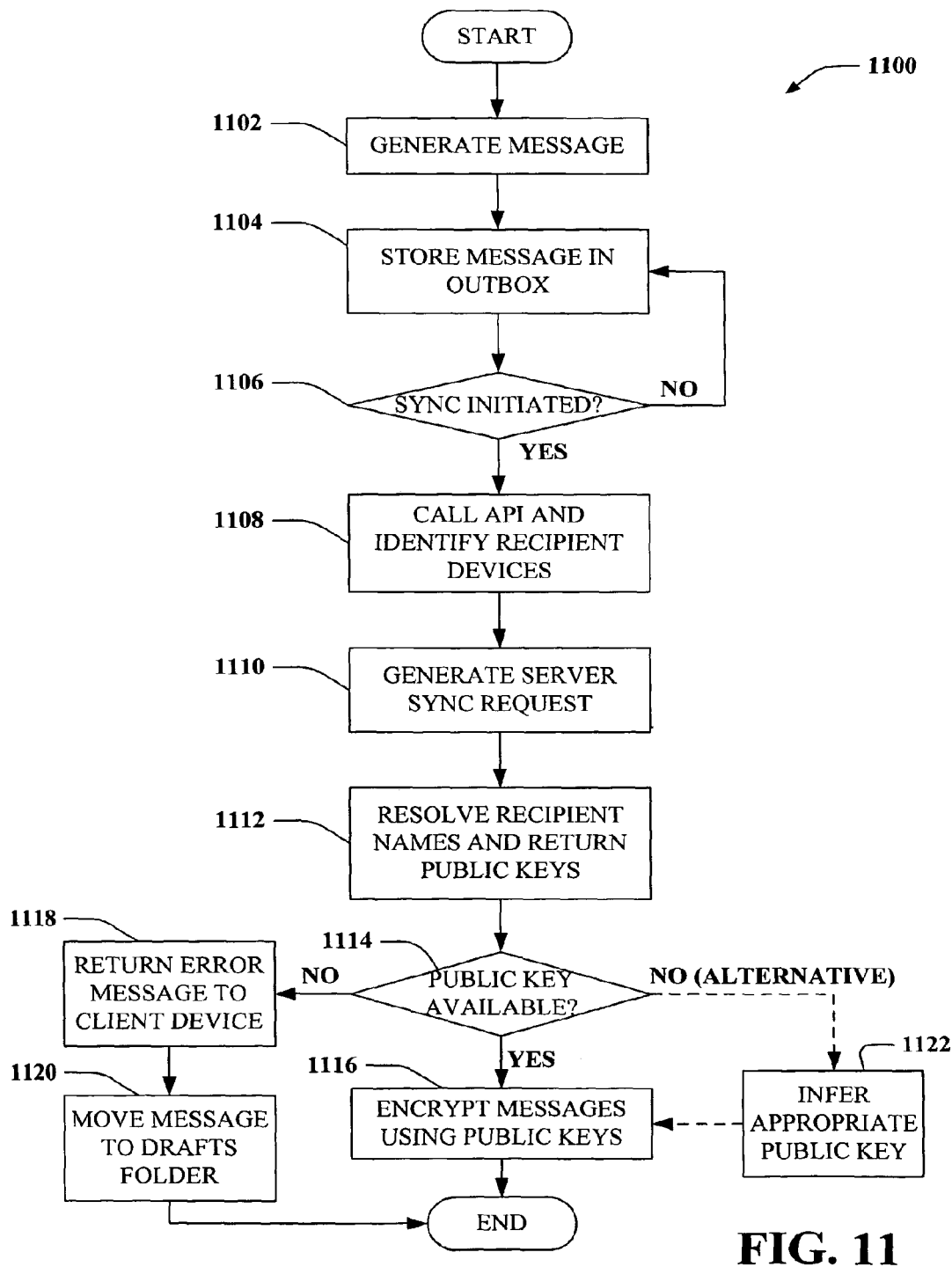
FIG. 11 is an illustration of a methodology for retrieving public keys for messages generated during an offline period on a mobile device, wherein the public keys are retrieved upon synchronization of the mobile device during initiation of an online session.

FIG. 11 is an illustration of a methodology 1100 for retrieving public keys for messages generated during an offline period on a mobile device, wherein the public keys are retrieved during synchronization of the mobile device upon initiation of an online session. At 1102, a user can compose a message that requires encryption while the mobile device is offline. When the user completes the message and "sends" it, the message is stored in a message outbox in the mobile device with a special indicator appended to it that indicates that the message requires encryption, at 1104, until it can actually be transmitted (e.g., when the mobile device goes online again). At 1106, a determination can be made regarding whether the mobile device has initiated an online session, such as by generating a synchronization request to synchronize with a message exchange server. If the determination indicates that the device is still offline, then the method can revert to 1104, where the message is retained in the outbox.

If the determination at 1106 indicates that the device is entering a period of online activity, then at 1108, a recipient identification API can be called, which assesses all messages in the outbox and compiles recipient information for messages that require public keys for encryption. At 1110 a server synchronization request can be generated and/or completed, and recipient names identified at 1108 can be appended to the synchronization request as a query to the server requesting the necessary public keys for encryption.

At 1112, a ResolveRecipients command can be issued to resolve the recipient list appended to the synchronization request against the server to obtain public keys and/or S/MIME certificates for the recipients in the list. The command can receive a comma-delimited list of recipient names generated at 1108, and can return an extensible markup language (XML) response comprising certificate information for the recipients. The following pseudo code snippet illustrates a command that comprises parameters to indicate that a certificate is desired for each resolved recipient, as well as information related to the type of certificate returned. It will be appreciated that the following is presented as an illustration into the functionality of the ResolveRecipients command in order to facilitate understanding of the subject invention, and is not intended to be interpreted in a limited sense.

TABLE-US-00002

POST /Microsoft-Server-
ActiveSync?Cmd=ResolveRecipients&User=jdoe&DeviceId=blah1 &DeviceType=PocketPC
Content-Type: application/vnd.ms-sync.wbxml MS-ASProtocolVersion: 2.5 <?xml
version="1.0" encoding="utf-8"?> <ResolveRecipients xmlns="ResolveRecipients:">
<To>foo</To> <To>mobile3</To> <Options> CertificateRetrieval>2</CertificateRetrieval>
<MaxCertificates>2</MaxCertificates>
<MaxAmbiguousRecipients>1</MaxAmbiguousRecipient> </Options> </ResolveRecipients>

A typical response can be, for instance:

TABLE-US-00003

<?xml version="1.0"
encoding="utf-8"?> <ResolveRecipients xmlns="ResolveRecipients:"> <Status>1</Status>
<?xml version="1.0" encoding="utf-8"?> <ResolveRecipients xmlns="ResolveRecipients:">
<Status>1</Status> <Response> <To>foo</To> <Status>4</Status> </Response>
</ResolveRecipients> <Response> <To> mobile 3</To> <Status>1</Status>
<RecipientCount>1</RecipientCount> <Recipient> <Type>1</Type> <DisplayName> mobile
3</DisplayName> <EmailAddress>mobile3@nowhere.com</EmailAddress> <Certificates>
<Status>1</Status> <CertificateCount>1</CertificateCount>
<RecipientCount>1</RecipientCount> <Certificate>x1peAs...</Certificate> </Certificates>
</Recipient> </Response> </ResolveRecipients>

In the response, it can be observed that "mobile 3" resolved correctly while the email alias "foo" did not. The <Type> node can be employed to determine the recipient type from the request—global address list or user's Contacts folder, and Status, which indicates whether retrieving the certificate succeeded or not. In this example, because "foo" did not resolve, no email address was received there for in the response. Such a scenario can be addressed by a issuing a ResolveRecipients command to search a contact list for the email address.

At 1114, a determination can be made regarding whether a public key was returned for each recipient name appended to the synchronization request. If all recipients have been resolved successfully and all public keys have been retrieved, then at 1116 messages can be S/MIME-encrypted using their respective public keys and then transmitted to respective recipients. In the event that one or more public keys were not returned as determined at 1114, then at 1118, an error message can be generated and stored in an inbox of the mobile device to alert the user of the device to the error (e.g., that the message was not sent, . . . ). Additionally, at 1120, the message(s) for which public keys were not returned can be stored to a "drafts" folder to maintain the message for later sending/attempts to send when a public key there for becomes available.

Alternatively, rather than proceeding to 1116 when a public key is determined to be unavailable at 1114, the method can proceed to 1122 to infer an appropriate public key for encryption. For example, the mobile device can comprise a key cache as detailed above with regard to FIG. 7, in which most frequently/recently used public keys can be stored. At 1122, an inference can be made that a previous public key associated with a recipient for whom no key was returned at 1114 can be employed to attempt encryption of the current message. The message can then be encrypted at 1116 for transmission to the intended recipient. In this manner, the methodology 1100 can facilitate retrieving public keys to encrypt messages stored in a user device upon synchronization of the user device with a message server when going online.

Figure 12:
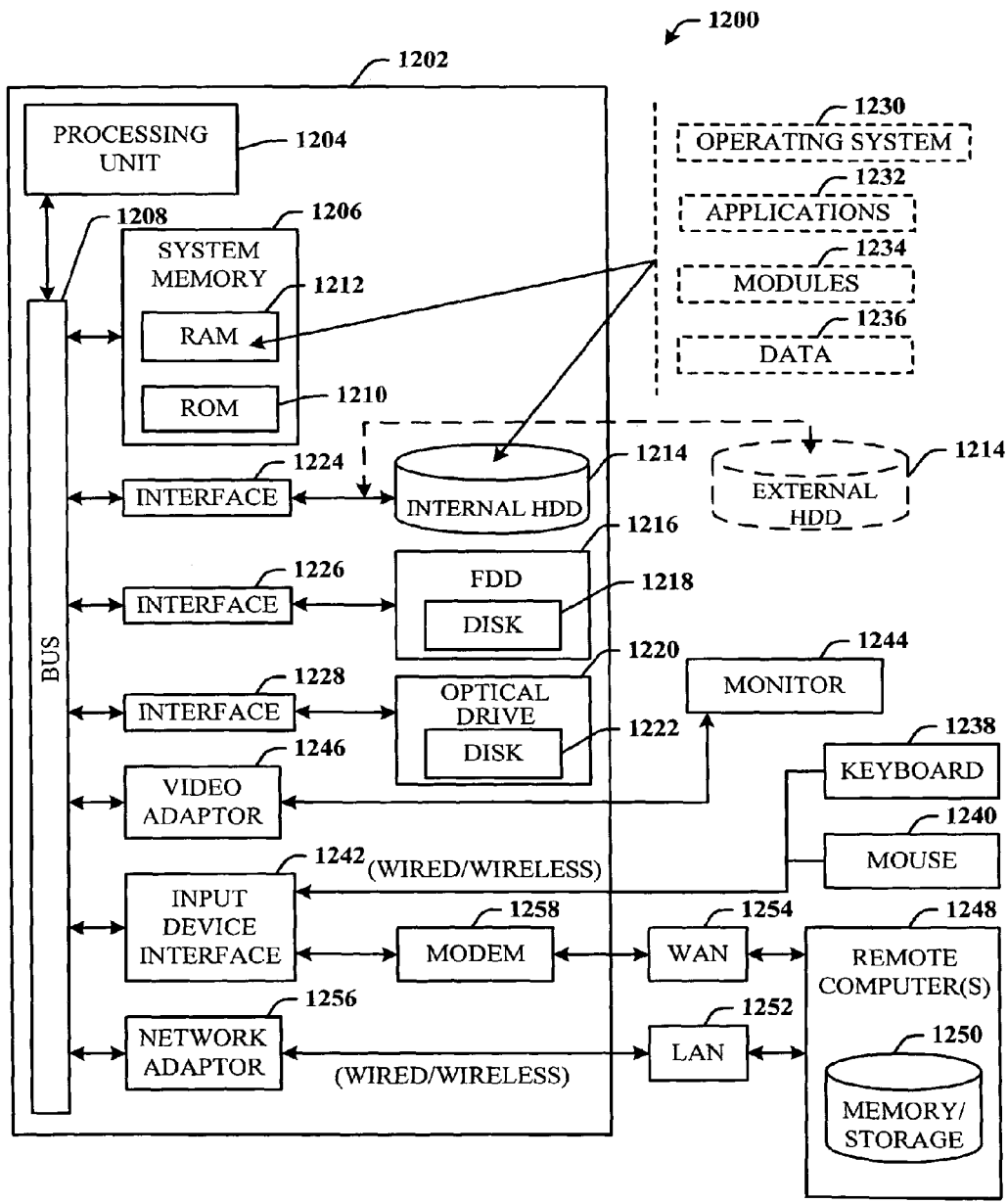
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a nonvolatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the subject invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256. When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 13:
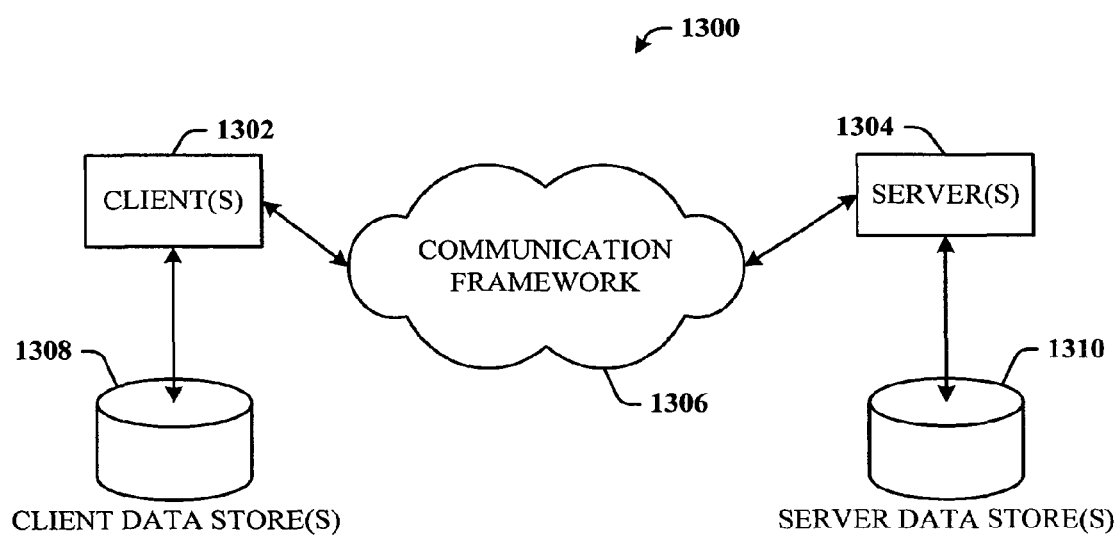
FIG. 13 illustrates a schematic block diagram of an exemplary computing environment in accordance with the subject invention.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the subject invention, for example. The system 1300 also includes one or more server(s) 1304. The server(s) 1304 can also be hardware and/or software (e.g., threads, processes, computing devices). The servers 1304 can house threads to perform transformations by employing the subject invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed:

1. A method for processing a message on a mobile device, comprising:
   storing a message designated to be encrypted during wireless communication on the mobile device during a period that the mobile device is unable to communicate with a server; and
   upon the mobile device becoming able to communicate with the server,
      assessing messages stored on the mobile device, identifying the stored message designated to be encrypted during wireless communication, and identifying an intended recipient for the stored message designated to be encrypted during wireless communication, and
      generating a synchronization request for synchronizing between the mobile device and the server, the synchronization request comprising a request for a public key associated with the identified recipient of the stored message.

2. The method of claim 1, wherein storing a message comprises associating the message with an identifier that indicates the message requires a public key.

3. The method of claim 1, wherein generating a synchronization request comprises identifying a recipient associated with the stored message.

4. The method of claim 3, wherein identifying a recipient associated with the stored message comprises identifying an email alias.

5. The method of claim 1, wherein the synchronization request comprising a request for a public key associated with an identified recipient comprises a synchronization request identifying at least one of an email alias or a device identifier.

6. The method of claim 5, wherein the synchronization request comprises a request to resolve at least one of an email alias or a device identifier against the server.

7. The method of claim 1, further comprising:
   transmitting the synchronization request to the server; and
   receiving a public key from the server.

8. The method of claim 7, further comprising:
   encrypting the stored message using the received public key; and
   transmitting the encrypted message to the recipient.

9. The method of claim 8, wherein encrypting the stored message comprises employing an S/MIME encryption technique.

10. The method of claim 1, further comprising generating an error message upon receipt of an indication a public key cannot be determined for the identified recipient.

11. The method of claim 10, further comprising storing the error message in an inbox data store for the mobile device and storing the stored message in a data store comprising drafts.

12. A tangible computer readable medium having instructions stored thereon that, if executed by a computing device, cause the computing device to perform operations comprising:
   storing messages designated to be encrypted during wireless communication on the mobile device during a period that the mobile device is unable to communicate with a server;
   upon the mobile device becoming able to communicate with the server,
      assessing messages stored on the mobile device, identifying stored messages designated to be encrypted during wireless communication, and identifying intended recipients for the stored messages designated to be encrypted during wireless communication, and
      generating a synchronization request for synchronizing between the mobile device and the server, the synchronization request comprising a request for public keys associated with identified recipients of a plurality of the stored messages.

13. The tangible computer readable medium of claim 12, wherein storing messages comprises associating an indicator with each stored message that is to be encrypted when transmitted.

14. The tangible computer readable medium of claim 13, wherein generating a synchronization request comprises:
   assessing the stored messages and compiling recipient information for messages having an associated indicator.

15. The tangible computer readable medium of claim 14, wherein compiling recipient information for messages having an associated indicator comprises compiling a list of recipients.

16. The tangible computer readable medium of claim 15, wherein the synchronization request comprising a request for public keys associated with identified recipients comprises the list of recipients.

17. The tangible computer readable medium of claim 16, wherein the list of recipients comprises email aliases.

18. A mobile device, comprising:
   a computing processor; and
   memory communicatively coupled with the computing processor, the memory comprising instructions executable on the computing processor to perform the following:
   storing a message on the mobile device during a period that the mobile device is unable to communicate with a server;
   associating the message with an identifier that indicates the message requires use of an encryption technique when transmitting;
   upon the mobile device becoming able to communicate with the server:
      assessing messages stored on the mobile device, identifying the stored message requiring use of an encryption technique when transmitting, and identifying an intended recipient for the stored message;
      generating a synchronization request for synchronizing between the mobile device and the server, the synchronization request comprising a request for a certificate associated with the identified recipient;
      transmitting the synchronization request; and
      receiving the certificate.

19. The mobile device of claim 18, the memory further comprising instructions to perform the following:
   encrypting data using the received certificate; and
   transmitting the encrypted data.

20. The mobile device of claim 19, wherein encrypting data using the received certificate comprises employing an S/MIME encryption technique.

* * * * *